(12) United States Patent
Parent et al.

(10) Patent No.: US 11,098,824 B2
(45) Date of Patent: Aug. 24, 2021

(54) FLUIDIC VALVE DEVICE

(71) Applicant: Commissariat A L'Energie Atomique et aux Energies Alternatives, Paris (FR)

(72) Inventors: Charlotte Parent, Grenoble (FR); Yves Fouillet, Grenoble (FR); Nicolas Verplanck, Grenoble (FR); Arthur Vauquelin, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 51 days.

(21) Appl. No.: 16/582,128

(22) Filed: Sep. 25, 2019

(65) Prior Publication Data
US 2020/0096122 A1 Mar. 26, 2020

(30) Foreign Application Priority Data
Sep. 26, 2018 (FR) ...................................... 18 58774

(51) Int. Cl.
*F16K 11/22* (2006.01)
*F16K 31/06* (2006.01)
(Continued)

(52) U.S. Cl.
CPC .......... *F16K 99/0046* (2013.01); *F16K 11/22* (2013.01); *F16K 11/24* (2013.01);
(Continued)

(58) Field of Classification Search
CPC ............ F16K 99/0046; F16K 99/0015; F16K 2099/008; F16K 31/0641; F16K 31/0603;
(Continued)

(56) References Cited

U.S. PATENT DOCUMENTS 3,203,447 A   8/1965  Bremner et al.
3,212,751 A * 10/1965  Hassa .................. F16K 31/086
                                                            251/65
(Continued)

FOREIGN PATENT DOCUMENTS

DE   102010039009 A1 *  2/2012  .............. F16K 11/22
JP      S6033508 U   *  3/1985
(Continued)

OTHER PUBLICATIONS

French Preliminary Search Report dated May 29, 2019 in French Application 18 58774, filed on Sep. 26, 2018 (with English Translation of Categories of Cited Documents & Written Opinion).

*Primary Examiner* — David Colon-Morales
(74) *Attorney, Agent, or Firm* — Oblon, McClelland, Maier & Neustadt, L.L.P.

(57) ABSTRACT

A fluidic valve device intended to be arranged in a fluidic circuit, the device notably including a first switching assembly including a first compartment defining a first internal space and a first permanent magnet arranged with the freedom to slide in the first internal space, a second switching assembly including a second compartment defining a second internal space and a second permanent magnet arranged with the freedom to slide in the second internal space, the first permanent magnet and the second permanent magnet being arranged relative to one another in such a way as to be in a first state of magnetic interaction, making it possible to obtain a first stable mechanical configuration or in a second state of magnetic interaction, it possible to obtain a second stable mechanical configuration.

10 Claims, 2 Drawing Sheets

(51) Int. Cl.
    *F16K 31/08*    (2006.01)
    *F16K 99/00*    (2006.01)
    *F16K 11/24*    (2006.01)
    *F16K 25/00*    (2006.01)

(52) U.S. Cl.
    CPC .......... *F16K 25/00* (2013.01); *F16K 31/0641* (2013.01); *F16K 31/086* (2013.01); *F16K 99/0015* (2013.01); F16K 2099/008 (2013.01)

(58) Field of Classification Search
    CPC ........ F16K 31/06; F16K 31/56; F16K 31/086; F16K 31/08; F16K 11/22; F16K 11/24
    USPC .......................................................... 251/65
    See application file for complete search history.

(56) References Cited

U.S. PATENT DOCUMENTS

| | | | | |
|---|---|---|---|---|
| 4,481,389 A * | 11/1984 | Johnson | ................ | F16K 31/086 200/61.86 |
| 4,694,860 A * | 9/1987 | Eidsmore | .............. | F16K 31/086 137/614.21 |
| 4,705,070 A * | 11/1987 | Eidsmore | .............. | F16K 31/086 137/614.21 |
| 4,750,705 A * | 6/1988 | Zippe | .................... | F16K 31/003 137/248 |
| 4,792,113 A * | 12/1988 | Eidsmore | ................ | F16K 17/24 251/65 |
| 5,169,117 A * | 12/1992 | Huang | .................. | F16K 31/086 251/30.01 |
| 5,450,877 A * | 9/1995 | Graffin | .................. | F16K 31/086 137/630.14 |
| 5,758,863 A * | 6/1998 | Buffet | .................... | F16K 31/086 251/28 |
| 6,112,764 A * | 9/2000 | Engdahl | ................. | F16K 17/36 137/38 |
| 8,585,013 B2 * | 11/2013 | Chung | ................ | F16K 99/0015 251/129.14 |
| 8,991,431 B2 * | 3/2015 | Zhou | ....................... | F16K 11/22 137/883 |
| 9,389,231 B2 * | 7/2016 | Edwards | ............... | F16K 99/003 |
| 2004/0256584 A1* | 12/2004 | Zimmerling | .......... | F16K 31/086 251/7 |
| 2010/0139797 A1* | 6/2010 | Delamarche | ........ | B01F 13/0059 137/806 |
| 2013/0061966 A1 | 3/2013 | Zhou et al. | | |
| 2014/0107589 A1 | 4/2014 | Amirouche et al. | | |
| 2015/0202082 A1* | 7/2015 | Ilios | .................... | A61F 9/00781 604/9 |
| 2017/0298966 A1 | 10/2017 | Nath et al. | | |

FOREIGN PATENT DOCUMENTS

| | | | |
|---|---|---|---|
| WO | WO 87/04745 A1 | 8/1987 | |
| WO | WO 2011/150813 A1 | 12/2011 | |
| WO | WO-2016195317 A1 * | 12/2016 | ............. F16K 27/04 |

* cited by examiner

FLUIDIC VALVE DEVICE

TECHNICAL FIELD OF THE INVENTION

The present invention relates to a fluidic valve device. The device has the particular feature of comprising switching means of magnetic type.

PRIOR ART

Fluidic valve devices which use mechanical and/or magnetic switching means are already well known.

Valves can be broken down into various categories: valves referred to as normally closed (NC) and valves referred to as normally open (NO). In the former case, when at rest, the valve is closed. In the latter case, when at rest, the valve is open. As the valve switches over from its rest position to its other position (two-position valve), external energy needs to be applied. This energy may be electrical, pneumatic, magnetic.

A further distinction is made between valves referred to as monostable and valves referred to as bistable.

In the case of a monostable valve, when the energy used to make it switch is cut off, the valve has to return to its rest state. For this return to the rest position, a return spring may suffice.

In the case of a bistable valve, the return can be achieved only by a further application of energy. When the energy is cut off, the valve remains in its final position, and only a further application of energy allows it to be returned to its initial position.

The disadvantage of a monostable solution is that the application of energy is needed in order to hold the valve in its final position, unlike the bistable solution.

A two-way or 2/2 (two ports and two positions) valve is a valve that has two ports, namely one fluidic inlet and one single fluidic outlet. The fluid is injected via the fluidic inlet and, depending on the position of the valve, is either allowed to flow towards the fluidic outlet, or is interrupted.

A three-way or 3/2 (three ports and two positions) valve is a valve that has three ports, with one fluidic inlet, a first fluidic outlet and a second fluidic outlet. The fluid is injected via the fluidic inlet and may, depending on the position of the valve, be routed either towards the first fluidic outlet or towards the second fluidic outlet.

At the present time, the valves used in microfluidic circuits are, in most instances, of the monostable type (although they can also be of the bistable type), of the NO or NC type, with no particular preference between NO and NC, but only of type 2/2.

Specifically, in microfluidic circuits, in order to build a type 3/2 valve solution, use is made of two monostable 2/2 valves in combination. These valves each require an individual actuator and the two actuators need to be perfectly synchronized.

Magnetically actuated valves are notably known from documents US 2017/298966 A1, US 2014/107589 A1, JP S6033508 U, WO 2011/150813 A1, U.S. Pat. No. 3,203,447 and WO 87/04745 A1.

The object of the invention is to propose a fluidic valve device of 3/2 type which is not a simple combination of two 2/2 valves, which is able to use just one single actuator, which does not require a special synchronization solution, and which is produced in a simple way so as to allow reliable operation.

SUMMARY OF THE INVENTION

This object is achieved by a fluidic valve device intended to be arranged in a fluidic circuit, the said device comprising:
  a first fluidic connection and a second fluidic connection,
  first opening/closing means designed to open or close the first fluidic connection, and second opening/closing means designed to open or close the second fluidic connection,
  switching means collaborating with the said first opening/closing means and the said second opening/closing means, the said switching means comprising:
    a first switching assembly comprising a first compartment defining a first internal space and a first permanent magnet arranged with the freedom to slide in a main direction in the said first internal space, between a first stable position for closing the first fluidic connection and a second stable position for opening the first fluidic connection,
    a second switching assembly comprising a second compartment defining a second internal space and a second permanent magnet arranged with the freedom to slide in the said main direction in the said second internal space, between a first stable position for closing the second fluidic connection and a second stable position for opening the second fluidic connection,
    the first permanent magnet and the second permanent magnet being oriented magnetically the same way round, in the said main direction, and offset by a non-zero distance that is sufficient to generate a gap in a direction transverse to the said main direction,
    the first permanent magnet and the second permanent magnet being arranged relative to one another in such a way as to be in a first state of magnetic interaction, making it possible to obtain a first stable mechanical configuration in which the first permanent magnet and the second permanent magnet are held respectively in their first position and in their second position by a magnetic effect alone or in a second state of magnetic interaction, making it possible to obtain a second stable mechanical configuration in which the first permanent magnet and the second permanent magnet are held respectively in their second position and in their first position by a magnetic effect.

According to one particular feature, the first permanent magnet and the second permanent magnet are identical.

According to another particular feature, the device comprises at least one magnetic control member designed to move between a first position and a second position in order to modify the magnetic interaction between the first permanent magnet and the second permanent magnet.

According to another particular feature, the magnetic control member is a permanent magnet.

According to another particular feature, the said distance is defined as a function of the magnetic strength of each permanent magnet, of the pressure of the fluid injected into the fluidic circuit, and/or of the size of each permanent magnet.

According to another particular feature, each compartment is defined by a cylinder in which the permanent magnet can move in sliding like a piston.

According to another particular feature, the first opening/closing means and the second opening/closing means consist of a flexible membrane that can be deformed mechanically under the action of a magnet.

According to another particular feature, the device is produced by an assembly of several superposed layers.

The invention also relates to a fluidic system comprising a fluidic board on which there is created a fluidic circuit comprising several fluidic valve devices as defined hereinabove, the said system comprising control means integrating each control member, the said control means taking the form of a board on which the control members are dispersed, each control member being positioned in such a way as to coincide with its fluidic valve device during a sequence of relative movement of the said board with respect to the fluidic circuit.

The invention also relates to the use of the fluidic valve device as defined hereinabove as a valve for controlling a fluidic circuit which comprises a fluidic inlet, a first fluidic outlet and a second fluidic outlet, the first fluidic connection being designed to connect the said fluidic inlet exclusively to the said first fluidic outlet, and the second fluidic connection being designed to connect the said fluidic inlet exclusively to the said second fluidic outlet.

BRIEF DESCRIPTION OF THE FIGURES

Further features and advantages will become apparent from the detailed description which follows, which is given with reference to the attached figures listed hereinbelow.

DETAILED DESCRIPTION OF AT LEAST ONE EMBODIMENT

The invention relates to a fluidic valve device.

Figure 1A:
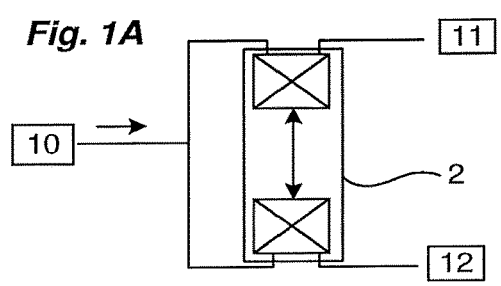
FIG. 1A depicts a conventional fluidic circuit with one inlet and two outlets, controlled by a bistable valve.
Figure 1B:
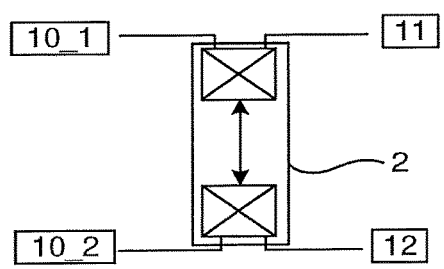
FIG. 1B depicts a fluidic circuit with two inlets and two outlets, controlled by a bistable valve.

The fluidic valve device of the invention is advantageously of the bistable type. It will be perfectly suited to operating according to the principle of a 3/2 (three ports and two positions) type valve. As depicted in FIG. 1A, it can be fitted to a fluidic (or microfluidic) circuit which comprises at least one fluidic inlet 10, a first fluidic outlet 11 and a second fluidic outlet 12. The terms "inlet" and "outlet" must of course be understood nonlimitingly, and "inlet" or "outlet" must simply be taken to refer to a fluidic path along which a fluid circulates. With reference to FIG. 1B, it would also be possible to have a fluidic circuit with two distinct fluidic connections in parallel with two inlets 10_1, 10_2 and two outlets 11, 12, a first fluidic connection connecting a first inlet 10_1 to a first outlet 11 and a second fluidic connection, distinct from the first, connecting the second inlet 10_2 to the second outlet 12. A same device according to the invention is therefore designed to control the two fluidic connections at the same time. The remainder of the description will refer, nonlimitingly, to a fluidic circuit with a single inlet and two outlets, but it will be easy to appreciate that the device of the invention can be applied to a solution having two distinct fluidic connections in parallel, with two inlets and two outlets.

With reference to FIG. 1A, the fluidic valve device 2 according to the invention is intended to place the circuit in a first fluidic state in which the fluidic inlet 10 is connected exclusively to the first fluidic outlet 11 and a second fluidic state in which the fluidic inlet 10 is connected exclusively to the second fluidic outlet 12. The fluidic circuit may be produced on a board (having, for example, the format of a credit card) made of transparent plastic. By way of example, such a fluidic circuit may comprise one or more reservoirs, various chambers, connecting ducts and therefore one or several valve devices like the one described in the present application.

For that, the fluidic valve device 2 according to the invention uses a magnetic solution with two permanent magnets 20, 21, which are both able to move between two positions and are synchronized by the magnetic effect alone.

The device 2 may comprise first opening/closing means intended to open or close a first fluidic connection between the fluidic inlet 10 and the first fluidic outlet 11 and second opening/closing means intended to open or close a second fluidic connection between the fluidic inlet 10 and the second fluidic outlet 12.

The first fluidic connection may comprise a first port and a second port and the first opening/closing means may comprise a first membrane made of a flexible material designed to move between a closed first state in which it closes off at least one of the two ports (or even both), interrupting the first fluidic connection, and an open second state in which it uncovers the two ports, allowing the first fluidic connection between the first port and the second port.

The second fluidic connection has the same features and may comprise a first port and a second port and the second opening/closing means may comprise a second membrane made of a flexible and deformable material designed to move between a closed first state in which it closes off at least one of the two ports (or even both), interrupting the second fluidic connection, and an open second state in which it uncovers the two ports, allowing the second fluidic connection between the first port and the second port.

Figure 2A:
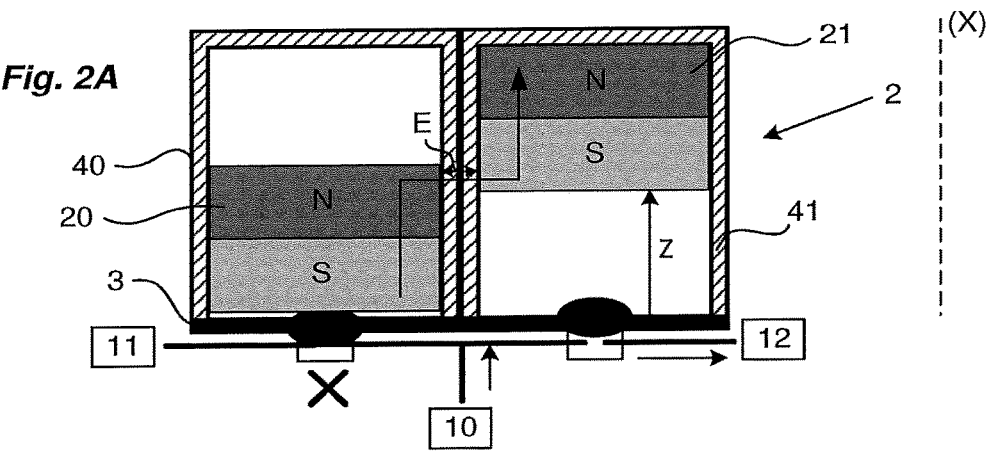
FIGS. 2A to 2C depict one particular embodiment of a bistable valve according to the invention.
Figure 2B:
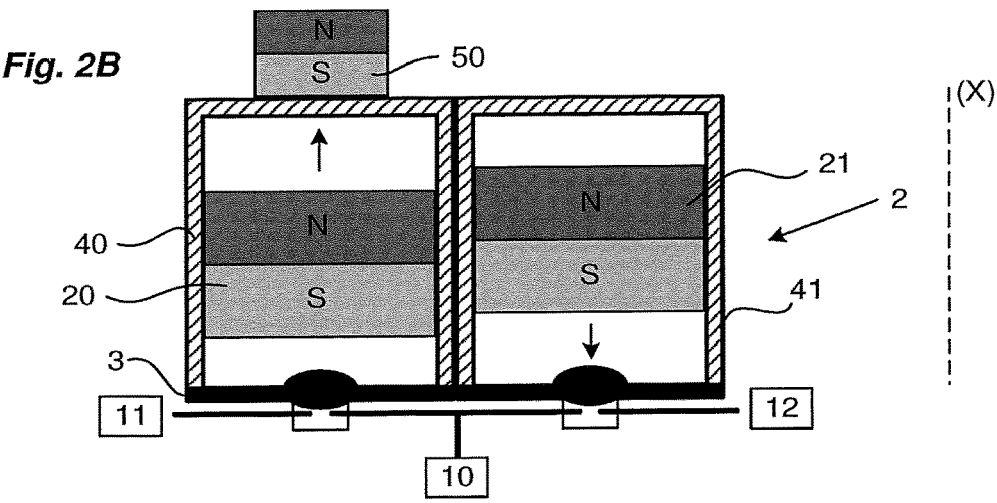
Figure 2C:
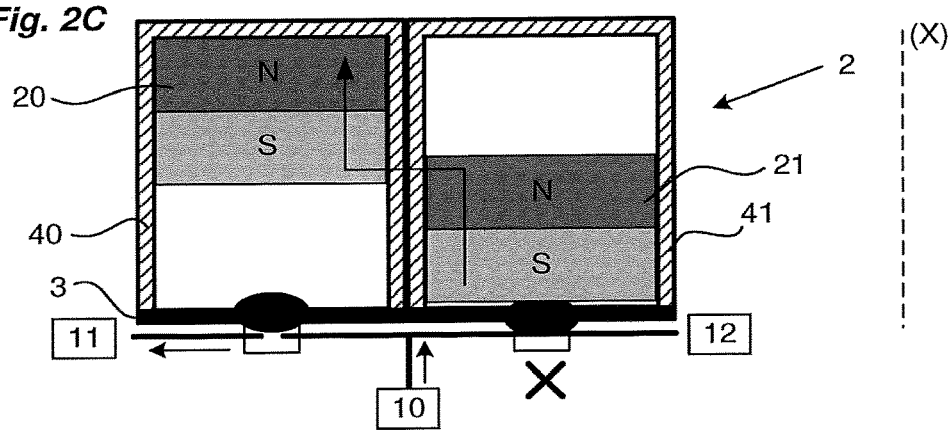

According to one particular aspect of the invention, the first membrane and the second membrane may be combined into the one same flexible and deformable membrane 3 comprising two distinct operating zones for each of the two series of two ports. It will be seen hereinafter that this single-membrane 3 solution may offer advantages in terms of the manufacture of the device. FIGS. 2A to 2C show the device of the invention employing a common membrane 3.

In order to actuate the first opening/closing means and the second opening/closing means, the device comprises switching means.

The switching means comprise two distinct switching assemblies, a first switching assembly dedicated to switching the first opening/closing means, and a second switching assembly dedicated to switching the second opening/closing means.

The first switching assembly and the second switching assembly are synchronized in operation so as to adopt a first state in which the first opening/closing means are open and the second opening/closing means are closed, and a second state in which the first opening/closing means are closed and the second opening/closing means are open. In the first state, the fluidic inlet 10 is therefore connected only to the first fluidic outlet 11, and in the second state, the fluidic inlet 10 is connected only to the second fluidic outlet 12.

According to one particular aspect of the invention, the synchronization between the first switching assembly and the second switching assembly is achieved through the magnetic effect alone.

The first switching assembly comprises a first cylinder 40 defining a first closed internal space and a first permanent magnet 20 housed in this first cylinder and arranged with the freedom to slide in the said internal space of the cylinder 40, so as to form a first piston. The translational movement of the first permanent magnet 20 in the first cylinder 40 takes place in a direction defined by an axis (X).

The second switching assembly comprises a second cylinder 41 defining a closed internal space and a second permanent magnet 21 housed in the second cylinder 41 and arranged with the freedom to slide in the said internal space of the second cylinder 41, forming a second piston. The translational movement of the second permanent magnet 21 in the second cylinder 41 takes place in a direction parallel to the aforementioned axis (X).

Advantageously, the two cylinders 40, 41 are identical and the two permanent magnets 20, 21 have identical shapes and magnetic "strengths".

In each switching assembly, the permanent magnet 20, 21 can move in sliding in its cylinder between two distinct stable mechanical positions referred to as the first position and second position.

In their first position, each permanent magnet 20, 21 collaborates with the membrane 3 to place it in its closed state. In their second position, the membrane 3 is released by the permanent magnets to adopt its open state.

The first cylinder and the second cylinder 40, 41 are preferably close enough together that the two permanent magnets 20, 21 are in magnetic interaction.

Thus are defined a first state of magnetic interaction, making it possible to obtain a first stable mechanical configuration in which the first permanent magnet 20 is in its first stable position and the second permanent magnet 21 in its second stable position, and a second state of magnetic interaction, making it possible to obtain a second stable mechanical configuration in which the first permanent magnet 20 is in its second stable position and the second permanent magnet 21 is in its first stable position. The two magnets are each held in their respective position by the magnetic effect alone.

Advantageously, in order to make the transition from the first state of magnetic interaction to the second state of magnetic interaction, the device may comprise a control member of magnetic type. This control member may comprise a permanent magnet 50. When a change in state is commanded, this permanent magnet 50 is brought close enough to magnetically interact (attract or repel) just one of the two permanent magnets 20, 21 (the first permanent magnet 20 or the second permanent magnet 21). The sliding movement of the controlled permanent magnet (the permanent magnet 20 in FIG. 2B) in one direction automatically, through a magnetic effect alone, causes the other permanent magnet 21 to move in sliding in the opposite direction. This then brings about movements of two pistons in opposite directions.

According to one particular aspect of the invention depicted in FIGS. 2A to 2C, the two permanent magnets 20, 21 are positioned in such a way that their magnetic field is oriented along the axis (X) of translation and with both the same way up (for example in the direction south (=S)-north (=N)).

According to one particular aspect of the invention, the two permanent magnets are arranged in such a way as to create between them a magnetic gap E (FIG. 2A) oriented in a direction that is transverse (preferably perpendicular) to the axis (X) defined above. This gap E makes it possible to create a magnetic circuit between the two permanent magnets 20, 21. The gap is generated because the two permanent magnets 20, 21 are offset by a distance Z (FIG. 2A) which is preferably strictly less than the total height of a permanent magnet (this height preferably being the same for both magnets). The length of the gap E is chosen to be non-zero and sufficient to ensure that a magnetic circuit is created between the two magnets. Because the two magnets slide in parallel in their respective cylinder, the length of this gap E is constant.

A sufficient distance Z has in fact to be left between the two permanent magnets 20, 21 so as to ensure each state of magnetic interaction between the two magnets, namely when one of the two magnets is in its first position and the other in its second position. Each state of magnetic interaction is created with north pole or south pole of the first permanent magnet 20 in front with respectively a south pole or a north pole of second permanent magnet 21, in the transversal direction with respect to (X), the two opposite poles being separated by a non-zero distance corresponding to said magnetic gap E. Said magnetic gap E is created by the shortest strength segment following the orthogonal direction to the translation direction (X) of the two magnets 20, 21.

Figure 3:
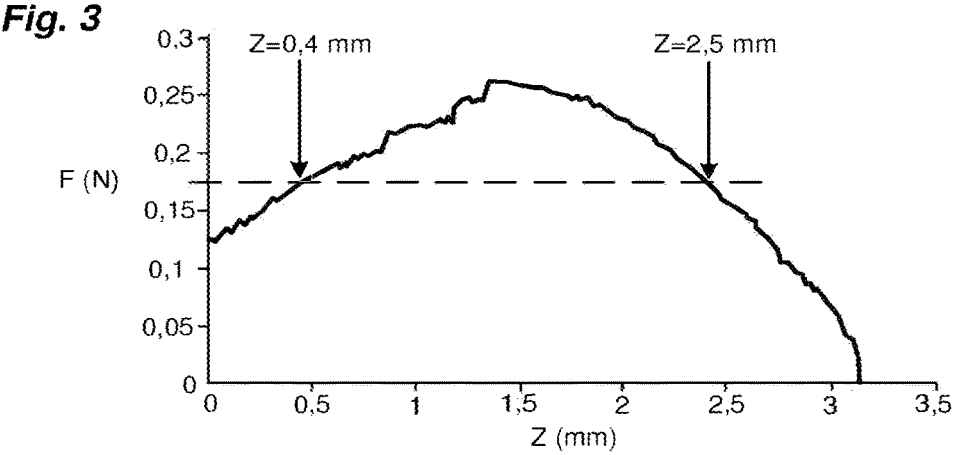
FIG. 3 depicts a curve illustrating the principle of magnetic regulation of the device of the invention. This curve notably shows the measurement, using a texture analyser, of the force F exerted by the first magnet on the second magnet as a function of the distance Z between the two magnets.

FIG. 3 depicts a curve illustrating how the force of magnetic interaction (expressed in Newtons) present between the two permanent magnets 20, 21 varies as a function of various values of the distance Z defined above (expressed in mm) and for a constant gap E. The distance Z thus corresponds to the separation (in the direction (X)) there is between the two magnets when one of the permanent magnets is in its first stable position and the other permanent magnet is in its second stable position. The curve was generated using two identical permanent magnets of cylindrical shape, having a height of 3 mm and a base diameter of 3 mm. The two cylinders are also identical and each have a height of 5.25 mm and a diameter of 3.2 mm. The magnets are separated from one another by a magnetic gap E of 0.6 mm. The two magnets chosen are made of nickel-plated neodymium, N45 (magnet reference: s-03-03-n from supermagnet: https://www.supermagnete.fr/aimants-disques-neodyme/disque-magnetique-diametre-3mm-hauteur-3mm-neodyme-n45-nickele_S-03-03-N).

In this figure, it can be seen that:
when the permanent magnets are only slightly offset (Z<0.5 mm), the level of magnetic interaction is weak;
when the permanent magnets are excessively offset (Z>2.5 mm), the level of magnetic interaction is likewise weak;

Between these two distances, the level of magnetic interaction is satisfactory, allowing the two permanent magnets 20, 21 to be held stably in their respective position.

Of course, the choice of the distance Z between the two magnets 20, 21 will depend on various factors, notably the size of the permanent magnets, their shape, their magnetic strength, the material of which they are made, etc.

FIGS. 2A to 2C illustrate the principle of operation of the fluidic valve device according to the invention.

In FIG. 2A, initially, the first permanent magnet 20 is in the first stable position and the second permanent magnet 21 is in the second stable position. The device is in its first state of magnetic interaction. The north pole of the first permanent magnet 20 is in front of the south pole of the second permanent magnet, separated by the magnetic gap E.

In FIG. 2B, the control permanent magnet 50 is brought closer to attract the first permanent magnet 20 towards its second position. In moving towards its second position, the magnetic interaction through the magnetic circuit present between the first permanent magnet 20 and the second permanent magnet 21 automatically causes the second permanent magnet 21 to move towards its first stable position. It may be noted that when the two magnets pass one another and lie at the same level, their respective orientation places the two north poles and the two south poles head to head, which corresponds to an unstable magnetic state. A neutral switch-over point is then generated when the two opposite poles are once again facing one another during the sliding.

In FIG. 2C, the first permanent magnet 20 has reached its second stable position and the second permanent magnet 21 has reached its first stable position. The device is in its second state of magnetic interaction. The south pole of the first permanent magnet 20 is in front of the north pole of the second permanent magnet, separated by the magnetic gap E.

By applying the principle of operation of the switching means described above to the fluidic valve device for controlling a fluidic circuit like that of FIG. 1A, it will be understood that:

in the first state of magnetic interaction: the fluidic inlet 10 of the circuit is disconnected from the first fluidic outlet 11 because the first permanent magnet 20 is in its first stable position, resting against the membrane 3 in order to position it in its closed state (indicated by a cross in FIG. 2A). The fluidic inlet 10 is therefore connected exclusively to the second fluidic outlet, the second permanent magnet 21 being in its second stable position, releasing the membrane 3 so that it can be in its open state (FIG. 2A);

in the second state of magnetic interaction: the fluidic inlet 10 of the fluidic circuit is connected exclusively to the first fluidic outlet 11 because the first permanent magnet 20 is in its second stable position, thus releasing the membrane 3 to place it in its open state. The fluidic inlet 10 is disconnected from the second fluidic outlet 12, the second permanent magnet 21 being in its first stable position, resting against the membrane 3 to place it in its closed state (indicated by a cross in FIG. 2C);

Likewise, as mentioned above, it will be appreciated that the device according to the invention will also be perfectly suited to managing the control of two independent fluidic connections in parallel, each of these connections comprising an inlet and an outlet, in a circuit like the one depicted in FIG. 1B. In this application, in the first state of magnetic interaction, the device is therefore designed to open the first fluidic connection and close the second fluidic connection, and in the second state of magnetic interaction, the device is designed to close the first fluidic connection and open the second fluidic connection.

According to an alternative form of embodiment, the opening/closing means may be secured to each permanent magnet. They may, for example, be a part made of rubber fixed to each magnet in order to seal the fluidic connection closed.

Figure 4:
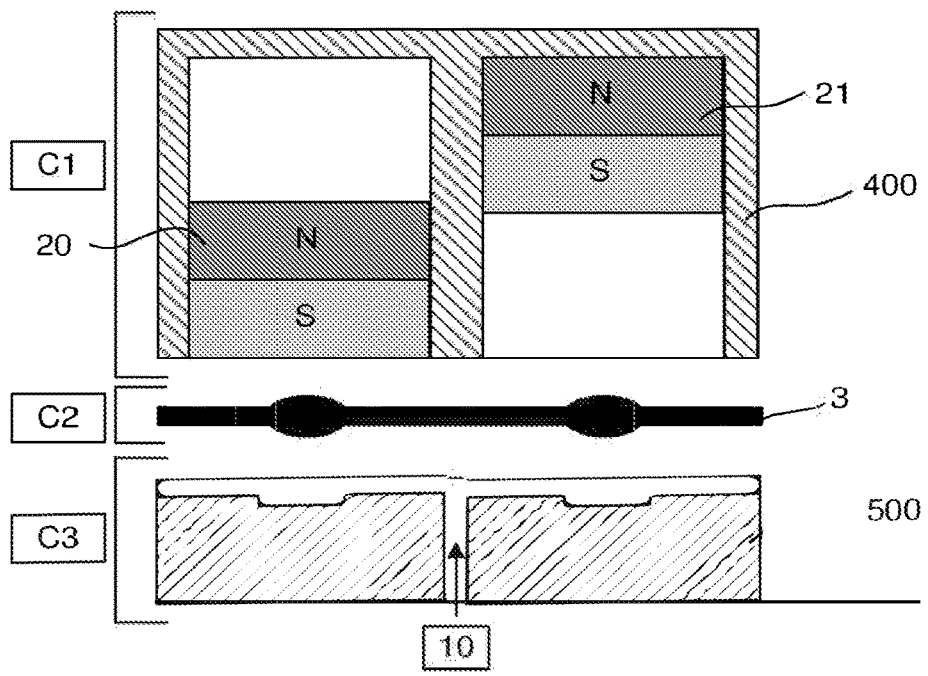
FIG. 4 illustrates a principle of manufacture of the fluidic valve device of the invention.

With reference to FIG. 4, the fluidic valve device that has the features defined hereinabove can be manufactured as several layers or substrates superposed on and assembled with one another. Nonlimitingly, it may comprise:

a first layer C1 comprising the switching means. This layer thus comprises a board 400 pierced with two blind cavities, each forming the internal space of a distinct cylinder 40, 41 of the device. The first permanent magnet 20 is inserted in one cavity and the second permanent magnet 21 is inserted into the second cavity.

a second layer C2 assembled on the first layer C1 and covering the two cavities in order to close them. This second layer is produced in the form of a flexible elastically deformable membrane 3. It may be made from material of the PDMS (polydimethylsiloxane) type or another material of the same type.

a third layer C3 comprising the fluidic circuit. This may be a board 500 in which the fluidic circuit is formed. Nonlimitingly, the circuit may comprise the fluidic inlet 10 and the two fluidic outlets 11, 12. Two channels of the circuit may open against the membrane, in line with a first cavity of the first layer, and two other channels of the circuit may open against the membrane in line with the second cavity of the first layer.

Figure 5:
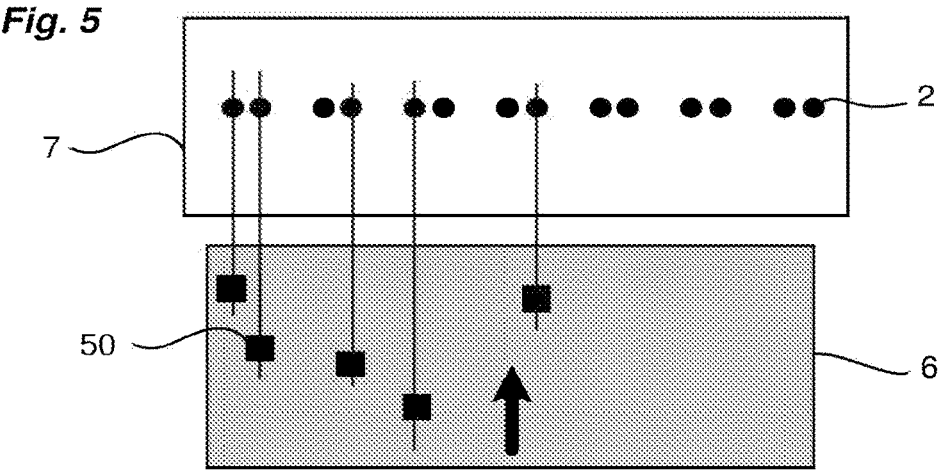
FIG. 5 depicts a control system that can be employed in the device of the invention.

According to one particular embodiment, when the one same microfluidic system 7 comprises a microfluidic circuit bearing several fluidic valve devices 2 (indicated by a spot in FIG. 5) having a configuration according to that described hereinabove, the control means may be configured to switch each valve device 2 according to a given sequence. Each control member of the control means may be actuated manually or by an actuator controlled by a central unit. It is also possible to position several control members on the one same board 6, as depicted in FIG. 5. Each control member is carefully positioned on the board 6 to coincide with its fluidic valve device when the switching of the valve is needed. The various control members 50 may be distributed over the board in order to define a determined switching sequence when the board 6 is moved relative to the fluidic circuit controlled by the valves.

The invention claimed is:

1. A fluidic valve device to be arranged in a fluidic circuit, said device comprises:
    a first fluidic connection and a second fluidic connection,
    first opening/closing means designed to open or close the first fluidic connection, and second opening/closing means designed to open or close the second fluidic connection,
    switching means collaborating with said first opening/closing means and said second opening/closing means, said switching means comprising:
        a first switching assembly comprising a first compartment defining a first internal space and a first permanent magnet arranged with the freedom to slide in a main direction in said first internal space, between a first stable position for closing the first fluidic connection and a second stable position for opening the first fluidic connection,
        a second switching assembly comprising a second compartment defining a second internal space and a second permanent magnet arranged with the freedom to slide in said main direction in said second internal space, between a first stable position for closing the second fluidic connection and a second stable position for opening the second fluidic connection,
        the first permanent magnet and the second permanent magnet being oriented magnetically the same way round, in said main direction, and offset in said main direction by a non-zero distance that is sufficient to generate a magnetic gap in a direction transverse to said main direction,
        the first permanent magnet and the second permanent magnet being arranged relative to one another in such a way as to be in a first state of magnetic interaction, in order to obtain a first stable mechanical configuration wherein the first permanent magnet and the second permanent magnet are held respectively in their first position and in their second position by the magnetic effect alone or in a second state of magnetic interaction, in order to obtain a second stable mechanical configuration in which the first permanent magnet and the second permanent magnet are held respectively in their second position and in their first position by the magnetic effect alone.

2. The device according to claim 1, wherein the first permanent magnet and the second permanent magnet are identical.

3. The device according to claim 1, comprising at least one magnetic control member designed to move between a first position and a second position in order to modify the magnetic interaction between the first permanent magnet and the second permanent magnet.

4. The device according to claim 3, wherein the magnetic control member is a permanent magnet.

5. The device according to claim 1, wherein said distance is defined as a function of the magnetic strength of each permanent magnet, of the pressure of the fluid injected into the fluidic circuit, and/or of the size of each permanent magnet.

6. The device according to claim 1, wherein each compartment is defined by a cylinder wherein the permanent magnet can move in sliding like a piston.

7. The device according to claim 1, wherein the first opening/closing means and the second opening/closing means consist of a flexible membrane that can be deformed mechanically under the action of either the first permanent magnet or the second permanent magnet.

8. The device according to claim 1, wherein said device is produced by an assembly of several superposed layers.

9. A fluidic system comprising a fluidic board on which there is created the fluidic circuit having several fluidic valve devices as defined in claim 3, wherein said fluidic system comprises control means integrating each control member, said control means taking the form of a board on which the control members are dispersed, each control member being positioned in such a way as to coincide with its fluidic valve device during a sequence of relative movement of said board with respect to the fluidic circuit.

10. A method of controlling the fluidic circuit with the fluidic valve device as defined in claim 1, said fluidic circuit comprising a fluidic inlet, a first fluidic outlet and a second fluidic outlet, said method comprising connecting, via the first fluidic connection, said fluidic inlet exclusively to said first fluidic outlet, and connecting, via the second fluidic connection, said fluidic inlet exclusively to said second fluidic outlet.

* * * * *